United States Patent

Pickett et al.

[11] Patent Number: 5,869,554
[45] Date of Patent: Feb. 9, 1999

[54] POLYCARBONATE COMPOSITIONS COMPRISING HINDERED AMINE LIGHT STABILIZERS AND ULTRAVIOLET LIGHT ABSORBERS

[75] Inventors: James Edward Pickett, Niskayuna; Randall Lee Carter, Clifton Park, both of N.Y.

[73] Assignee: General Electric Company, Schenectady, N.Y.

[21] Appl. No.: 922,058

[22] Filed: Sep. 2, 1997

[51] Int. Cl.⁶ .............. C08K 5/34; C08K 5/07; C08K 5/10; C07D 241/08
[52] U.S. Cl. .............. 524/99; 524/100; 524/101; 524/102; 524/103; 544/182; 544/385; 544/386; 544/387
[58] Field of Search ............ 544/386, 387, 544/182; 524/99, 100, 101, 102, 103, 385, 386, 387, 182

[56] References Cited

U.S. PATENT DOCUMENTS

| | | |
|---|---|---|
| 3,919,234 | 11/1975 | Ramey et al. ............ 544/358 |
| 3,920,659 | 11/1975 | Ramey et al. ............ 544/358 |
| 4,190,571 | 2/1980 | Lai et al. ............ 544/360 |
| 4,208,522 | 6/1980 | Ramey et al. ............ 544/385 |
| 4,292,240 | 9/1981 | Lai et al. ............ 544/231 |
| 4,452,504 | 6/1984 | Morris et al. ............ 524/99 |
| 4,480,092 | 10/1984 | Lai et al. ............ 544/113 |
| 5,071,981 | 12/1991 | Son et al. ............ 544/198 |

*Primary Examiner*—Yogendra N. Gupta
*Attorney, Agent, or Firm*—Noreen C. Johnson; Douglas E. Stoner

[57] ABSTRACT

Weatherable polycarbonate compositions (formulations or blends) comprise at least one of a piperazinone and piperazine dione based HALS, and at least one of a benzotriazole, benzophenone, triazine, oxanilide, and cyanoacrylate based UVA. The combination of these HALS and UVA exhibits a synergy that results in enhanced protection of the polycarbonate compositions by imparting photostability to the polycarbonate formulations, thereby reducing yellowing or other forms of light induced degradation.

9 Claims, 1 Drawing Sheet

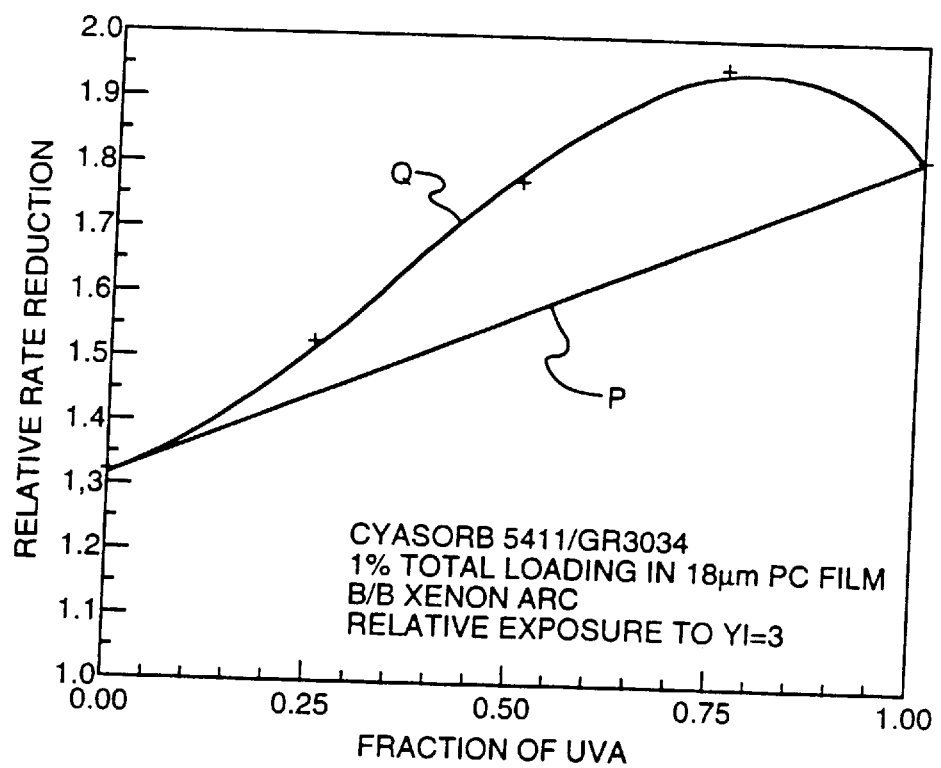

POLYCARBONATE COMPOSITIONS COMPRISING HINDERED AMINE LIGHT STABILIZERS AND ULTRAVIOLET LIGHT ABSORBERS

FIELD OF INVENTION

The instant invention relates to weatherable compositions (blends and formulations) comprising polycarbonate, hindered amines light stabilizers, and ultraviolet light absorbers.

BACKGROUND OF THE INVENTION

Formulations and blends comprising polycarbonates are known to degrade upon prolonged exposure to sunlight or other forms of light. One of the effects observed is yellowing of the polycarbonate blend/formulation. This problem has been alleviated by the use of light absorbers or light blockers in the polycarbonate blends. Thus ultraviolet light absorbers (UVA) are known to be used in polycarbonate formulations to protect these formulations from degradation due to exposure to different forms of light.

Use of Hindered Amine Light Stabilizers (HALS) to stabilize polyolefins has been known. Commercially used HALS have been based mainly on 2,2,6,6-tetramethyl piperidine, except for those based on piperazinones. U.S. Pat. Nos. 4,190,571; 4,292,240; 4,480,092; and 5,071,981 disclose some of the piperazinone based HALS. In addition while U.S. Pat. Nos. 3,919,234, 3,920,659 and 4,208,522 disclose some piperazine dione based HALS.

The use of HALS in polycarbonates is not very common. The stabilizing effect of HALS on polycarbonate formulations/blends has been described as "minor", see for example Thompson and Klemchuk, in Polymer Durability; R. L. Clough et al., ACS Advances in Chemistry 249, 1995, pp 303–317. The use of UVA in polycarbonate formulations has provided a way to retard the rate of degradation of polycarbonates as a result of exposure to light. This method however does not offer a complete protection of polycarbonate formulations from light induced degradation or discoloration. There is thus a continued need for a method or formulation that will help protect polycarbonate based formulations/blends from degradation or discoloration due to exposure to light.

It has been surprisingly found that use of the piperazinone and piperazine dione based HALS, and the benzotriazole, benzophenone, triazine, oxanilide, and cyanoacrylate based UVA in polycarbonate compositions, exhibits a synergistic effect in protecting the polycarbonate compositions from light induced degradation. This synergistic effect increases the photostability of polycarbonate compositions thereby slowing the yellowing and degradation of polycarbonate compositions.

SUMMARY OF THE INVENTION

The instant invention provides a composition comprising a polycarbonate, at least one of a piperazinone and a piperazine dione based HALS, and at least one of a benzotriazole, benzophenone, triazine, oxanilide, and cyanoacrylate based UVA. Incorporation of the piperazinone and piperazine dione based HALS, and the benzotriazole, benzophenone, triazine, oxanilide, and cyanoacrylate based UVA in the polycarbonate composition surprisingly displays a synergistic effect in protecting the polycarbonates from the undesired degradation or discoloration due to exposure to light, thereby rendering weatherable polycarbonate compositions.

BRIEF DESCRIPTION OF DRAWINGS

The FIGURE plots exposures required to attain a YI of 3.0 (relative to an unstabilized control, Sample 1) for BPA polycarbonate films containing various ratios of UVA to HALS at 1 % by weight of the total polycarbonate composition.

DETAILED DESCRIPTION OF THE INVENTION

The present invention provides a composition comprising, a polycarbonate, at least one of a piperazinone and piperazine dione based HALS, and at least one of a benzotriazole, benzophenone, triazine, oxanilide, and cyanoacrylate based UVA. Another embodiment of the invention provides a composition wherein, (a) the polycarbonate comprises from about 90% to about 99.9% by weight of the total composition; and (b) the piperazinone and piperazine dione based HALS and the benzotriazole, benzophenone, triazine, oxanilide, and cyanoacrylate based UVA, taken together, comprise from about 0.1% to about 10% by weight of the total composition, the ratio of the piperazinone and piperazine dione based HALS to the benzotriazole, benzophenone, triazine, oxanilide, and cyanoacrylate based UVA being from about 5:95 to about 90:10. In a further preferred embodiment is provided a composition wherein the ratio of the piperazinone and piperazine dione based HALS to that of the benzotriazole, benzophenone, triazine, oxanilide, and cyanoacrylate based UVA is from about 5:95 to about 20:80. Another preferred embodiment provides a composition wherein the ratio of the piperazinone and piperazine dione based HALS to that of the benzotriazole, benzophenone, triazine, oxanilide, and cyanoacrylate based UVA is from about 20:80 to about 75:25.

A second aspect of the instant invention provides a composition comprising, (a) a polycarbonate; (b) at least one of a piperazinone and piperazine dione based HALS; (c) at least one of a benzotriazole, benzophenone, triazine, oxanilide, and cyanoacrylate based UVA; (d) an additive; and (e) a blend stock. In one of its embodiment is provided a composition wherein: (a) the polycarbonate comprises from about 10% to about 99.9% by weight of the total composition; (b) the piperazinone or piperazine dione based HALS and the benzotriazole, benzophenone, triazine, oxanilide, and cyanoacrylate based UVA, taken together, comprise from about 0.05% to about 10% by weight of the total composition; (c) additives comprise from about 0.01% to about 25% by weight of the total composition; and (d) the blend stock comprises from about 0% to about 89% by weight of the total composition. The preferred polycarbonate is BPA polycarbonate.

Another preferred embodiment provides a composition wherein the piperazinone or piperazine dione based HALS is selected from:

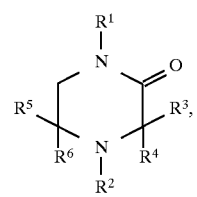

Formula I

-continued

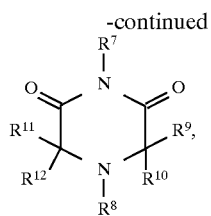
Formula II

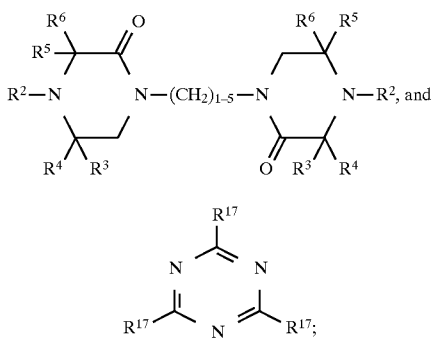
Formula III

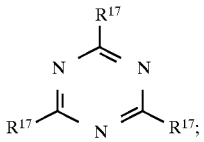
Formula IV wherein:

$R^1$ and $R^2$ are independently $C_{1-24}$ alkyl, hydrogen, acyl, benzyl, $C_{1-12}$ haloalkyl, $C_{2-14}$ alkenyl, unsubstituted $C_{7-14}$ aralkyl, or carboalkoxy; $R^2$ optionally also represents oxygen; $R^3$ and $R^4$ independently represent $C_{1-18}$ haloalkyl, $C_{1-18}$ alkyl, $C_{5-18}$ cycloalkyl, $C_{2-18}$ alkenyl, or unsubstituted $C_{7-18}$ aralkyl; or $R^3$ and $R^4$, when taken together with the carbon to which they are attached, form a $C_{4-12}$ alicyclic ring; $R^5$ and $R^6$ are independently $C_{1-18}$ haloalkyl, $C_{1-18}$ alkyl, $C_{2-18}$ alkenyl, or unsubstituted $C_{7-18}$ aralkyl; or $R^5$ and $R^6$ when taken together with the carbon atom to which they are attached, form a $C_{4-12}$ alicyclic ring; $R^7$ is $C_{1-20}$ alkyl, benzyl, $$-A-\overset{O}{\underset{\|}{C}}-O-R^{15}, \text{ or}$$

$$-(CH_2)_n-\underset{R^{14}}{\overset{R^{13}}{\text{(phenyl)}}}-OH;$$

$R^8$ is hydrogen, $C_{1-24}$ alkyl, or aryl; $R^9$ and $R^{10}$ independently represent $C_{1-18}$ haloalkyl, $C_{1-18}$ alkyl, $C_{5-18}$ cycloalkyl, $C_{2-18}$ alkenyl, or unsubstituted $C_{7-18}$ aralkyl; or $R^9$ and $R^{10}$, when taken together with the carbon to which they are attached, form a $C_{4-11}$ alicyclic ring; $R^{11}$ and $R^{12}$ are independently $C_{1-18}$ haloalkyl, $C_{1-18}$ alkyl, $C_{2-18}$ alkenyl, or unsubstituted $C_{7-18}$ araalkyl; or $R^{11}$ and $R^{12}$ when taken together with the carbon atom to which they are attached, form a $C_{4-12}$ alicyclic ring; $R^{13}$ and $R^{14}$ are independently $C_{1-8}$ alkyl, wherein at least one of said groups is branched on the $\alpha$ carbon atom; $R^{15}$ is $C_{1-20}$ alkyl; $R^{17}$ is

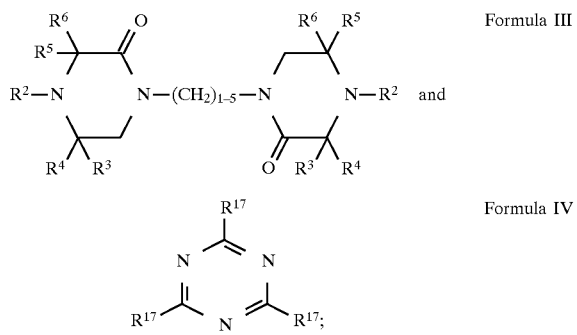

$R^{18}$ is H or $C_{1-4}$ alkyl; A is a straight or branched chain (lower) alkylene having from 1 to 6 carbon atoms optionally substituted with $C_1$–$C_6$ alkyl; and n represents an integer from 1 to 4.

Preferred HALS are represented by:

Formula III

Formula IV wherein:

$R^3$, $R^4$ $R^5$, and $R^6$ are each methyl;

$R^{17}$ is and $R^{18}$ is H or $C_{1-4}$ alkyl. A further preferred embodiment provides a composition wherein the HALS is a piperazine dione represented by Formula II wherein:

$R^9$ and $R^{10}$ independently represent methyl; or $R^9$ and $R^{10}$, when taken together with the carbon to which they are attached, form a cyclohexyl ring; and $R^{11}$ and $R^{12}$ independently methyl; or $R^{11}$ and $R^{12}$, when taken together with the carbon atom to which they are attached, form a cyclohexyl ring.

The ultraviolet light absorbers (UVA) useful in the present invention are those which are generally compatible with polycarbonates in general. Preferred are benzotriazole, benzophenone, triazine, oxanilide, and cyanoacrylate based UVA represented by the following structural formulae:

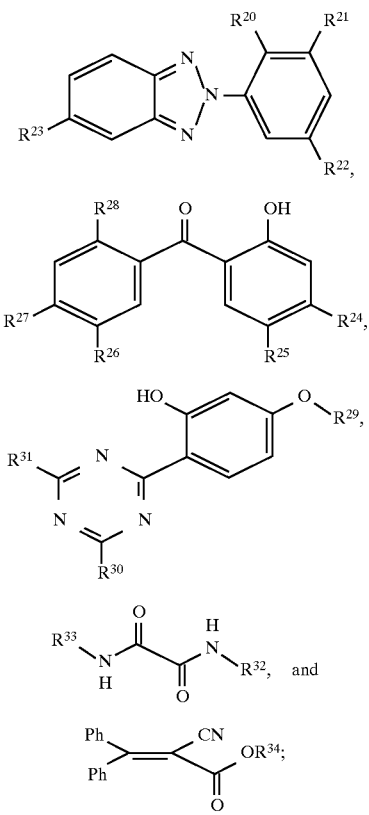

Formula V

Formula VI

Formula VII

Formula VIII

Formula IX wherein:

$R^{20}$ is OH;

$R^{21}$ is $C_1$–$C_{15}$ branched or straight chain alkyl, $C(CH_3)_2C_6H_5$,

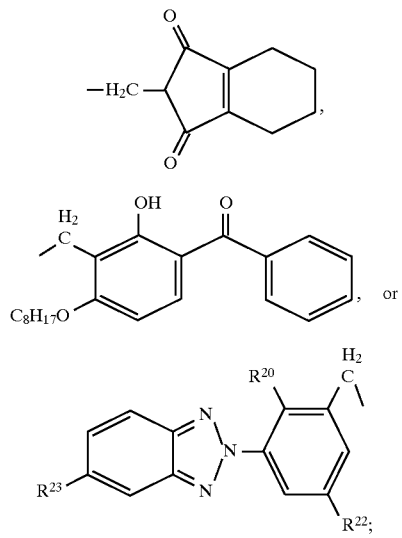

$R^{22}$ is $C_1$–$C_{15}$ branched or straight chain alkyl, —$C(CH_3)_2C_6H_5$, —$(CH_2)_2$—$C(O)$—$O$—$C_8H_{17}$, —$CH_2$—$CH_2$—$C(O)$—$O$—$(C_2H_4O)_8$—H, —$CH_2CH_2$—$O$—$C(O)$—$C(CH_3)$=$CH_2$, or —$C(C_6H_5)_2$—$CH_3$;

$R^{23}$ is H or Cl;

$R^{24}$ is OH, —$OC_1$—$C_{12}$alkyl, —$O$—$CH_2CH$=$CH_2$, —$O$—$(CH_2)_3Si(OEt)_3$, —$OCH_2COOH$, —$O(CH_2)_2OC(O)$—$CH$=$CH_2$, —$OCH_2CH_2OH$, or —$O$—$CH_2$—$CH(OH)$—$CH_2O$—$C_8H_{17}$;

$R^{25}$ is H, benzoyl, $SO_3H$, or $SO_3Na$;

$R^{26}$ is H, $SO_3H$, or $SO_3Na$;

$R^{27}$ is H, OH, $OCH_3$, or —$C(CH_3)_3$;

$R^{28}$ is H or OH;

$R^{29}$ is —$C_1$–$C_{10}$ alkyl, or —$C_{1-6}$ branched or straight chain alkyl-O—$C_{10}$–$C_{15}$ straight chain alkyl;

$R^{30}$ and $R^{31}$ independently represent a phenyl radical optionally substituted with up to two $C_1$–$C_4$ alkyl substituents;

$R^{32}$ and $R^{33}$ independently represent aryl groups substituted with at least one of $C_1$–$C_{12}$ alkyl or $C_1$–$C_8$ alkoxy group; and $R^{34}$ represents $C_1$–$C_8$ straight chain alkyl group, $C_4$–$C_8$ branched alkyl group, or a $C_1$–$C_6$ hydroxy alkyl group.

Further preferred UVA's are those represented by Formula V, Formula VI, and Formula VII wherein:

$R^{20}$ is OH;

$R^{21}$ is $C(CH_3)_3$, $C(CH_3)_2C_2H_5$, $C(CH_3)_2Ph$, or $CH(CH_3)C_2H_5$;

$R^{22}$ is $CH_3$, $C(CH_3)_3$, $C(CH_3)_2Ph$, $CH_2$—$CH_2$—$C(O)$—$O$—$(C_2H_4OH)_8$, or $C(CH_3)_2CH_2$—$C(CH_3)_3$;

$R^{23}$ is H;

$R^{24}$ is OH or $OC_1$—$C_4$ alkyl;

$R^{25}$ is H or benzoyl;

$R^{26}$ is H;

$R^{27}$ is H, OH, or $OCH_3$;

$R^{28}$ is H or OH;

$R^{29}$ is $C_{1-4}$ alkyl; and $R^{30}$ and $R^{31}$ independently represent a phenyl radical substituted with $C_{1-2}$ alkyl. Specifically preferred UVA are 2-(2'-hydroxyaryl benzotriazole), 2,4-diaryl-6-(2'-hydroxyaryl)-s-triazines, and 4,6-dibenzoyl resorcinol.

As used in the instant invention a polycarbonate comprises multiple structural units represented by the formula

[—O—$A^1$—O—C(O)—]   Formula X wherein $A^1$ is a divalent aromatic hydrocarbon radical. Suitable $A^1$ radicals include m-phenylene, p-phenylene, 4,4'-biphenylene, 4,4'-bi(3,5-dimethyl)-phenylene, 2,2-bis(4-phenylene)propane and similar radicals such as those which correspond to the dihydroxy-substituted aromatic hydrocarbons disclosed by name or formula (generic or specific) in U.S. Pat. No. 4,217,438.

The $A^1$ radical preferably has the formula

—$A^2$—Y—$A^3$—   Formula XI wherein each of $A^2$ and $A^3$ is a mono cyclic divalent aromatic hydrocarbon radical and Y is a bridging hydrocarbon radical in which one or two atoms separate $A^2$ from $A^3$. The free valence bonds in formula X are usually in the meta or para positions of $A^2$ and $A^3$ in relation to Y. Compounds in which $A^1$ has formula XI are bisphenols, and for the sake of brevity the term "bisphenol" is sometimes used herein to designate the dihydroxy-substituted aromatic hydrocarbons; it should be understood, however, that non-bisphenol compounds of this type may also be employed as appropriate.

In formula XI, the $A^2$ and $A^3$ values may be unsubstituted phenylene or hydrocarbon-substituted derivatives thereof, illustrative substituents (one or more) being alkyl and alkenyl. Unsubstituted phenylene radicals are preferred. Both $A^2$ and $A^3$ are preferably p-phenylene, although both may be o- or m-phenylene or one o- or m-phenylene and the other p-phenylene.

The bridging radical, Y, is one in which one or two atoms, preferably one, separate $A^2$ from $A^3$. Illustrative radicals of this type are methylene, cyclohexyl-methylene, 2-[2.2.1]-bicycloheptylmethylene, ethylene, isopropylidene, neopentylidene, cyclohexylidene, cyclopentadecylidene, cyclododecylidene and adamantylidene; gem-alkylene (alkylidene) radicals are preferred. Also included, however, are unsaturated radicals. For reasons of availability and particular suitability for the purposes of this invention, the preferred bisphenol is 2,2-bis(4-hydroxyphenyl)propane ("BPA"), in which Y is isopropylidene and $A^2$ and $A^3$ are each p-phenylene. A detailed description of polycarbonates used in the instant invention is described in U.S. Pat. Nos. 4,125,572; 3,028,365; 3,334,154; and 3,915,926; all of which are incorporated herein by reference.

The compositions of the instant invention comprise at least one of a piperazinone and piperazine dione based HALS, and at least one of a benzotriazole, benzophenone, triazine, oxanilide, and cyanoacrylate based UVA. It should be noted that one or a mixture of more than one piperazinone and piperazine dione based HALS along with one or a mixture of more than one benzotriazole, benzophenone, triazine, oxanilide, and cyanoacrylate based UVA can be used as part of the instantly claimed compositions. The piperazinone and piperazine dione based HALS are generally represented by Formula I, Formula II, Formula III, or Formula IV while the benzotriazole, benzophenone, triazine, oxanilide, and cyanoacrylate based UVA are represented by Formula V, Formula VI, Formula VII, Formula VIII, and Formula IX. Also as used herein, additives may include such materials as colorants, whitening agents, thermal stabilizers, metal deactivators, impact modifiers, extenders, antistatic agents, and processing aids. The different additives that can be incorporated in the compositions of the instant invention are commonly used and known to one skilled in the art. Illustrative descriptions of such additives may be found in R. Gachter and H. Muller; Plastics Additives, 4th edition, 1993 and are incorporated herein by reference.

Also, as used in the instant invention, the phrase blend stock is used to describe one or more ingredients represented by aromatic polyesters, aliphatic polyesters, and styrenic polymers. Examples of blend stocks include poly(2,4-butylene terephthalate), poly(ethylene terephthalate), acrylonitrile-butadiene-styrene copolymer (ABS), styrene-acrylonitrile copolymer (SAN, styrene-acrylonitrile-acrylate copolymers (ASA), and poly(1,4-cyclohexanedimethanol-1,4-cyclohexanedicarboxylate) (PCCD).

EXPERIMENTAL DETAILS

Mixtures of UVA and HALS impart a synergistic effect when used in combination. Thus, rather than using a particular amount of UVA or HALS alone in a formulation, it is advantageous to use a mixture of UVA and HALS. This effect will generally be independent of the structure of the UVA and independent of the structure of the HALS, as long as the HALS is compatible with the polycarbonate and the UVA has significant absorption in the range of 295–330 nm. A typical UVA used is Cyasorb® 5411, which is a product of Cytec Corporation and belongs to the benzotriazole class of UVA. The piperazinone class of HALS, typified by Goodrite® 3034 (GR3034), is an illustrative example of an effective class of HALS.

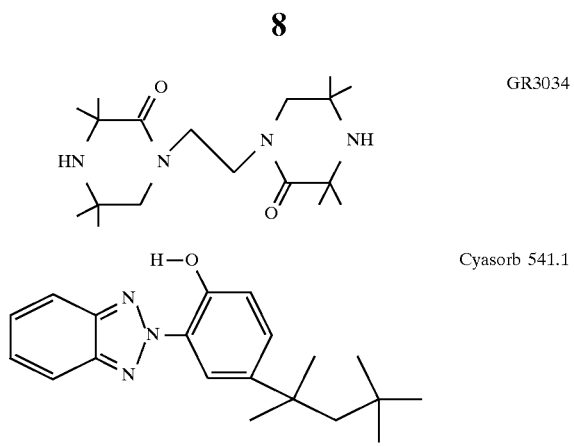

The ratio of UVA to HALS, at which the maximum synergism occurs, is probably dependent on the thickness of the sample, the nature of the colorants that might be present, the absorptivity of the UVA, and the light exposure conditions. The following data shows maximum effectiveness at a ratio of approximately 0.75 UVA to 0.25 HALS in approximately 18 microns thick polycarbonate film.

EXAMPLE 1

Photostability of Solvent-Cast Films.

BPA polycarbonate (BPA-PC) films approximately 18 microns thick were cast from methylene chloride by drawing 20% solids solutions on a glass plate using a 6 mil doctor blade. The HALS and UVA, taken together, were added to the methylene chloride solution at a total of 1% by weight of the polycarbonate composition in the ratios shown in Table 1. The UVA was Cyasorb® 5411 (a benzotriazole based UVA) and the HALS was Goodrite® 3034 (a piperazine based HALS).

Samples were exposed in an Atlas Ci35a xenon arc Weather-ometer equipped with type S borosilicate inner and outer filters. The light cycle was 160 minutes long at an irradiance of 0.77 W/m² at 340 nm, black panel temperature 75° C., dry bulb temperature 45° C., and wet bulb depression 10° C. There was a 20 minute dark cycle with water spray during the last 15 minutes. Exposure is measured in total kilojoules (kJ) of irradiance at 340 nm.

The amount of light exposure for the films to reach a Yellowness Index (YI, ASTTM D-1925) of 3.0 are shown in Table 1.

TABLE 1

Performance of UVA/HALS ratios at 1% of total loading composition

| Sample # | % of UVA | % of HALS | Exposure to YI = 3.0 | Relative yellowing rate reduction |
|---|---|---|---|---|
| 1 | 0 | 0 | 870 kJ/m² | (1) |
| 2 | 1 | 0 | 1580 | 1.82 |
| 3 | 0.75 | 0.25 | 1696 | 1.95 |
| 4 | 0.50 | 0.50 | 1536 | 1.77 |
| 5 | 0.25 | 0.75 | 1391 | 1.52 |
| 6 | 0 | 1 | 1145 | 1.32 |

*Calculated by dividing exposure in the previous column by control exposure.

The results are also plotted in the FIGURE which shows the positive deviation from linearity indicative of a synergistic effect of the combination of UVA and HALS. The straight line (identified by the letter 'P' in the FIGURE)

represents the expected additive/resulting effect, on the photostability of the polycarbonate composition, as a consequence of incorporating the piperazinone based HALS and the benzotriazole based UVA in the BPA-PC. The curve (identified by the letter 'Q' in the FIGURE) is the actual effect observed, on the phtotstability of the BPA-PC, as a consequence of incorporating the piperazinone based HALS and the benzotriazole based UVA in the BPA-PC. The positive deviation represented by the curve Q from the expected linearity represented by the line P is indicative of the synergistic effect observed as a result of combining the piperazinone based HALS and the benzotriazole based UVA in the BPA-PC.

We claim:

1. A composition comprising:

(a) a polycarbonate;
    (b) a piperazinone based HALS; and
    (c) at least one of a benzotriazole, benzophenone, triazine, oxanilide, and cyanoacrylate based UVA.

2. A composition of claim 1 wherein:

(a) the polycarbonate comprises from about 90% to about 99.9% by weight of the total composition; and
    (b) the piperazinone and piperazine dione based HALS and the benzotriazole, benzophenone, triazine, oxanilide, and cyanoacrylate based UVA, taken together comprise from about 0.1% to about 10% by weight of the total composition, the ratio of the piperazinone and piperazine dione based HALS to the benzotriazole, benzophenone, triazine, oxanilide, and cyanoacrylate based UVA being from about 5:95 to about 90:10.

3. A composition of claim 2 wherein the ratio of the piperazinone based HALS to that of benzotriazole, benzophenone, triazine, oxanilide, and cyanoacrylate based UVA is from about 5:95 to about 20:80.

4. A composition of claim 2 wherein the ratio of the piperazinone based HALS to that of the benzotriazole, benzophenone, triazine, oxanilide, and cyanoacrylate based UVA is from about 20:80 to about 75:25.

5. A composition of claim 4 wherein the polycarbonate is a polycarbonate of 2,2-bis(4-hydroxyphenyl)propane.

6. A composition of claim 1 wherein the HALS is a piperazinone represented by:

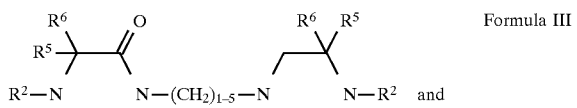

Formula III

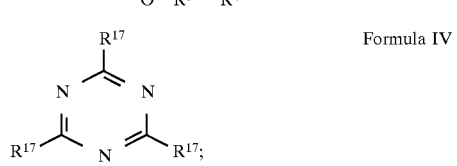

Formula IV wherein:

$R^3$, $R^4$, $R^5$, and $R^6$ are each methyl;

$R^{17}$ is

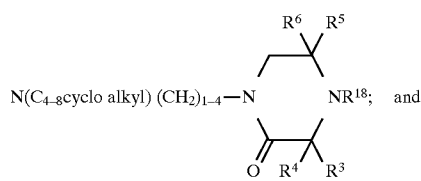

$R^{18}$ is H or $C_{1-4}$ alkyl.

7. A composition of claim 1 wherein the benzotriazole, benzophenone, triazine, oxanilide, and cyanoacrylate based UVA is selected from:

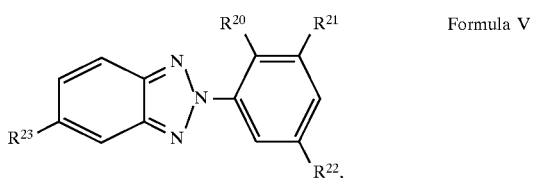

Formula V

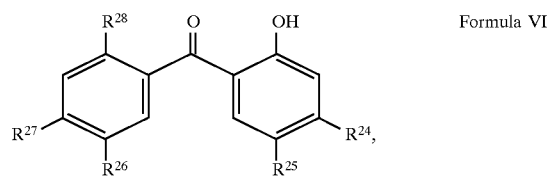

Formula VI

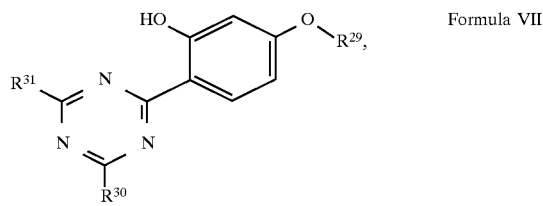

Formula VII

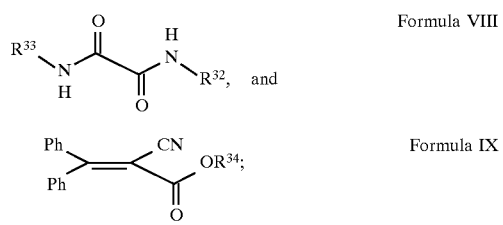

Formula VIII

Formula IX wherein:

$R^{20}$ is OH;

$R^{21}$ is $C_1$–$C_{15}$ branched or straight chain alkyl, $C(CH_3)_2C_6H_5$,

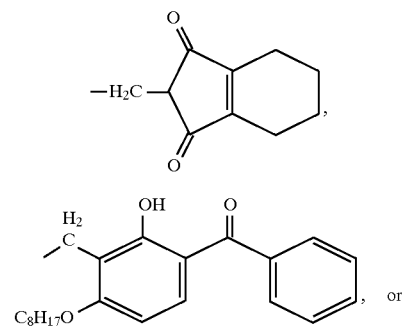

, or

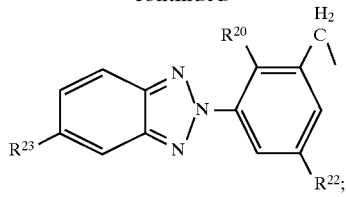

$R^{22}$ is $C_1$-$C_{15}$ branched or straight chain alkyl, —C(CH$_3$)$_2$C$_6$H$_5$, —(CH$_2$)$_2$—C(O)—O—C$_8$H$_{17}$, —CH$_2$—CH$_2$—C(O)—O—(C$_2$H$_4$O)$_8$—H, —CH$_2$CH$_2$—OC(O)—C(CH$_3$)=CH$_2$, or —C(C$_6$H$_5$)$_2$—CH$_3$;

$R^{23}$ is H or Cl;

$R^{24}$ is OH, —OC—C$_{12}$alkyl, —O—CH$_2$CH=CH$_2$, —O—(CH$_2$)$_3$Si(OEt)$_3$, —OCH$_2$COOH, —O(CH$_2$)$_2$OC(O)—CH=CH$_2$, —OCH$_2$CH$_2$OH, or —O—CH$_2$—CH(OH)—CH$_2$O—C$_8$H$_{17}$;

$R^{25}$ is H, benzoyl, SO$_3$H, or SO$_3$Na;;

$R^{26}$ is H, SO$_3$H, or SO$_3$Na;

$R^{27}$ is H, OH, OCH$_3$, or —C(CH$_3$)$_3$;

$R^{28}$ is H or OH;

$R^{29}$ is —C$_1$-C$_{10}$ alkyl, or —C$_{1-6}$ branched or straight chain alkyl-O—C$_{10}$-C$_{15}$ straight chain alkyl;

$R^{30}$ and $R^{31}$ independently represent a phenyl radical optionally substituted with up to two C$_1$-C$_4$ alkyl substituents;

$R^{32}$ and $R^{33}$ independently represent aryl groups substituted with at least one of C$_1$-C$_{12}$ alkyl or C$_1$-C$_8$ alkoxy group; and $R^{34}$ represents C$_1$-C$_8$ straight chain alkyl group, C$_4$-C$_8$ branched alkyl group, or C$_1$-C$_6$ hydroxy alkyl group.

8. A composition of claim 7 wherein the UVA is 2(-2'-hydroxy aryl benzotriazole), 2,4-diaryl-6-(2'-hydroxy aryl)-s-triazines, or 4,6-dibenzoyl resorcinol.

9. A composition of claim 5 wherein the piperazinone based HALS is selected from:

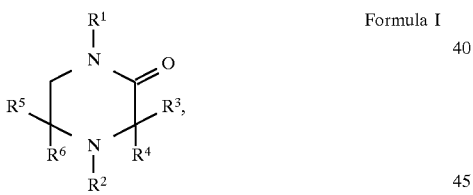

Formula I

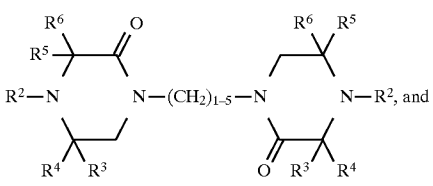

Formula III

Formula IV wherein:

$R^1$ and $R^2$ are independently C$_{1-24}$ alkyl, hydrogen, acyl, benzyl, C$_{1-12}$ haloalkyl, C$_{1-12}$ alkyl, C$_{2-14}$ alkenyl, unsubstituted C$_{7-14}$ aralkyl, or carboalkoxy;

$R^2$ optionally also represents oxygen;

$R^3$ and $R^4$ independently represent C$_{1-18}$ haloalkyl, C$_{1-18}$ alkyl, C$_{5-18}$ cycloalkyl, C$_{2-18}$ alkenyl, or unsubstituted C$_{7-18}$ aralkyl; or $R^3$ and $R^4$, when taken together with the carbon to which they are attached, form a C$_{4-11}$ alicyclic ring;

$R^5$ and R6 are independently C$_{1-18}$ haloalkyl, C$_{1-18}$ alkyl, C$_{2-18}$ alkenyl, or unsubstituted C$_{7-18}$ aralkyl; or $R^5$ and $R^6$ when taken together with the carbon atom to which they are attached, form a C$_{4-11}$ alicyclic ring;

$R^7$ is C$_{1-20}$ alkyl, benzyl, $$-A-\overset{O}{\underset{\|}{C}}-O-R^{15}, \text{ or}$$

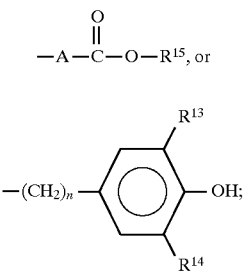

$R^8$ is hydrogen;

$R^9$ and $R^{10}$ independently represent C$_{1-18}$ haloalkyl, C$_{1-18}$ alkyl, C$_{5-18}$ cycloalkyl, C$_{2-18}$ alkenyl, or unsubstituted C$_{7-18}$ aralkyl; or $R^9$ and $R^{10}$, when taken together with the carbon to which they are attached, form a C$_{4-11}$ alicyclic ring;

$R^{11}$ and $R^{12}$ are independently C$_{1-18}$ haloalkyl, C$_{1-18}$ alkyl, C$_{2-18}$ alkenyl, or unsubstituted C$_{7-18}$ araalkyl; or $R^{11}$ and $R^{12}$ when taken together with the carbon atom to which they are attached, form a C$_{4-11}$ alicyclic ring;

$R^{13}$ and $R^{14}$ are independently C$_{1-8}$ alkyl, wherein at least one of said groups is branched on the $\alpha$ carbon atom;

$R^{15}$ is C$_{1-20}$ alkyl;

$R^{17}$ is

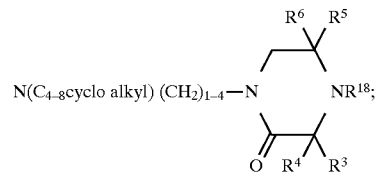

$R^{18}$ is H or C$_{1-4}$ alkyl;

A is a straight or branched chain alkylene having from 1 to 6 carbon atoms optionally substituted with C$_1$-C$_6$ alkyl; and n represents an integer from 1 to 4.

* * * * *